United States Patent
Hunt et al.

(10) Patent No.: US 12,536,666 B2
(45) Date of Patent: Jan. 27, 2026

(54) COMPUTER SOFTWARE MODULE ARRANGEMENT, A CIRCUITRY ARRANGEMENT, AN ARRANGEMENT AND A METHOD FOR IMPROVED IMAGE PROCESSING

(71) Applicant: Telefonaktiebolaget LM Ericsson (publ), Stockholm (SE)

(72) Inventors: Alexander Hunt, Tygelsjö (SE); Héctor Caltenco, Oxie (SE); Saeed Bastani, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 468 days.

(21) Appl. No.: 17/926,762

(22) PCT Filed: May 27, 2020

(86) PCT No.: PCT/EP2020/064770
§ 371 (c)(1),
(2) Date: Nov. 21, 2022

(87) PCT Pub. No.: WO2021/239224
PCT Pub. Date: Dec. 2, 2021

(65) Prior Publication Data
US 2023/0206449 A1 Jun. 29, 2023

(51) Int. Cl.
*G06T 7/11* (2017.01)
*G06T 7/20* (2017.01)

(52) U.S. Cl.
CPC . *G06T 7/11* (2017.01); *G06T 7/20* (2013.01)

(58) Field of Classification Search
CPC ..... G06T 7/11; G06T 7/20; G06T 5/70; G06T 5/73; G06T 2207/20012; G06T 2207/20021
(Continued)

(56) References Cited

U.S. PATENT DOCUMENTS

| 6,044,114 A | 3/2000 | Ibenthal et al. |
| 6,891,977 B2 | 5/2005 | Gallagher |

(Continued)

FOREIGN PATENT DOCUMENTS

| CN | 105516721 A | 4/2016 |
| EP | 0802679 A2 | 10/1997 |

(Continued)

OTHER PUBLICATIONS

Semi-supervised Learning on Semantic Manifold for Event Analysis in Dynamic Scenes (Year: 2007).*

(Continued)

*Primary Examiner* — Matthew C Bella
*Assistant Examiner* — Pardis Sohraby
(74) *Attorney, Agent, or Firm* — Murphy, Bilak & Homiller, PLLC

(57) ABSTRACT

An image processing arrangement (100) comprising a controller (101) configured to: a) receive (410) image data; b) perform semantic analysis (430) on the image data to c) identify (432)) a first region (R1) and a second region (R2) and to d) select (434) first settings (S1) and second settings (S2) corresponding to the identified first region (R1) and (Continued)

second region (R2) respectively; e) adapt (440) at least one filter (316, 314) according to the selected first and second settings (S1, S2, Sx); and f) perform (450) image processing on image data based on the adapted at least one filter (316, 314) wherein the first settings (S1) are applied to the at least one filter (316, 314) for the first region (R1) and the second settings (S2) are applied to the at least one filter (316, 314) for the second region (R2).

20 Claims, 6 Drawing Sheets

(58) Field of Classification Search
USPC .......................................................... 382/100
See application file for complete search history.

(56) References Cited

U.S. PATENT DOCUMENTS

| | | | |
|---|---|---|---|
| 11,238,596 B1* | 2/2022 | Gadde | G06V 30/274 |
| 2008/0008349 A1 | 1/2008 | Binnig et al. | |
| 2015/0325023 A1* | 11/2015 | Gross | G06V 10/255 |
| | | | 382/203 |
| 2017/0142327 A1 | 5/2017 | Bayani | |
| 2018/0197040 A1* | 7/2018 | Krishnamurthi | G06T 11/60 |
| 2021/0248408 A1* | 8/2021 | Deng | G06T 7/13 |
| 2023/0050833 A1* | 2/2023 | Cherubini | G06T 7/0012 |

FOREIGN PATENT DOCUMENTS

| | | | |
|---|---|---|---|
| EP | 1347415 A1 | 9/2003 | |
| JP | 2006067521 A | 3/2006 | |
| JP | 2007243987 A | 9/2007 | |
| JP | 2008097657 A | 4/2008 | |
| WO | 2006108654 A2 | 10/2006 | |
| WO | 2011127961 A1 | 10/2011 | |
| WO | 2017173578 A1 | 10/2017 | |
| WO | 2019194863 A1 | 10/2019 | |

OTHER PUBLICATIONS

Nishimura, Jim, et al., "Automatic ISP Image Quality Tuning Using Nonlinear Optimization", 25th IEEE International Conference on Image Processing (ICIP), Athens Greece, Oct. 2018, 1-5.

Vestergaard, Jacob Schack, et al., "Introducing Semantic Segmentation Mattes", Video, Apple, Inc., <https://developer.apple.com/videos/play/wwdc2019/260/>, 2019, 1-2.

* cited by examiner

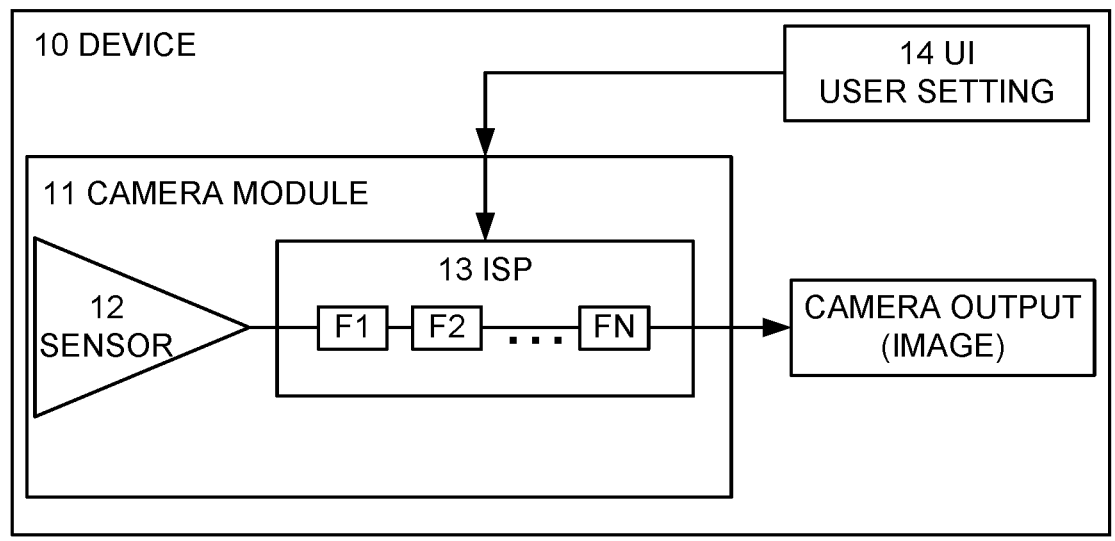
FIG. 1
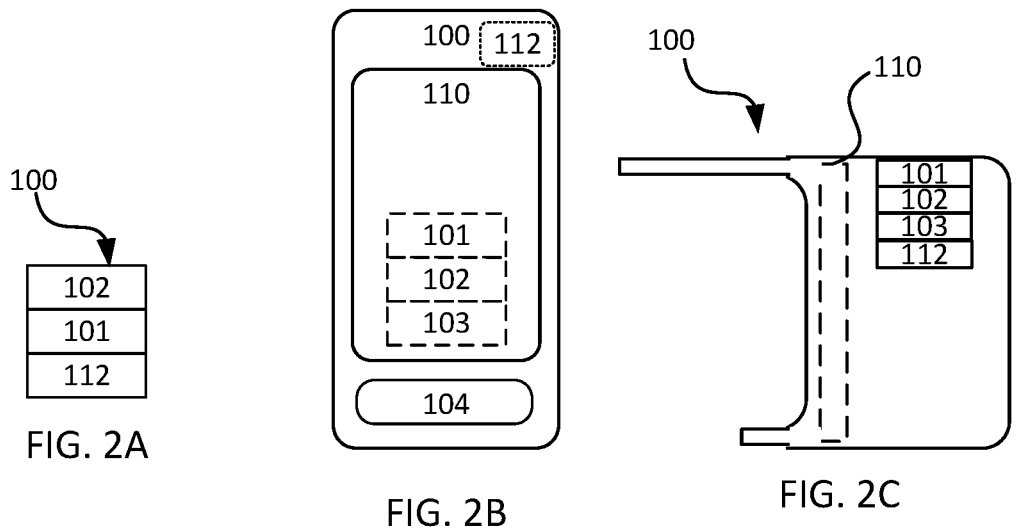
FIG. 2A
FIG. 2B
FIG. 2C

COMPUTER SOFTWARE MODULE ARRANGEMENT, A CIRCUITRY ARRANGEMENT, AN ARRANGEMENT AND A METHOD FOR IMPROVED IMAGE PROCESSING

TECHNICAL FIELD

The present invention relates to an arrangement, an arrangement comprising computer software modules, an arrangement comprising circuits, a device and a method for providing an improved manner of image processing, and in particular to an arrangement, an arrangement comprising computer software modules, an arrangement comprising circuits, a device and a method for providing an improved manner of image processing through improved filtering by image signal processing.

BACKGROUND

Digital imagery is based on an image sensor receiving light through a lens. The image sensor most commonly comprises a matrix of photo sensors, often photo diodes, that each provide a numerical value representing the light that affects the photo sensor; this is the raw sensor data representing the image. The raw sensor data is subsequently processed through an image processor, also known as an Image Signal Processor (ISP). The ISP applies a series of filters to the sensor data in order to produce an image that is perceivable by a human user. Examples of such filters include, but is not limited to:
  Sensor color filter arrangement,
  Demosaicing (providing appropriate colour and brightness to each pixel),
  Noise reduction (reducing or removing visual effects caused by noise in the electronic circuitry of the image sensor) and
  Image sharpening (preserving impression of depth, clarity and fine details by finding and sharpening edges that have been softened into fuzziness commonly when providing appropriate colours).

As (camera) image quality is one of the most important sales criteria for digital cameras, smart phones and other devices comprising or utilizing digital imagery, more and more technologies offer different filter settings that may be used for different scenarios in order to obtain an improved filtering, compared to a standard filter set. These filter settings are usually aimed at a specific type of motives, such as a sport setting, portrait setting, landscape setting and so on. FIG. 1 shows a schematic view of how a contemporary digital imagery device filters an incoming image based on user settings. A device 10, such as a smartphone or digital imagery viewing device (for example night-vision goggles), has a camera module 11 for providing images to be used in the device 10. As a reader would understand there is a plethora of uses for how an image may be used in a device, and this text will not go into details on this. Suffice to say that the camera module 11 is arranged to provide a camera output such as an image or stream of images. The camera module 11 in its simplest form comprises an image sensor 12 and an Image Signal Processor (ISP) 13, which ISP 13 is arranged to receive image data as input from the image sensor 12 and process the image data by applying a series of filters F1, F2 . . . FN to the image data to provide the camera output, as is indicated by the arrow from the sensor 12 in FIG. 1.

The device 10 may have a user interface (UI) 14 through which user settings may be received. These user settings may be fed to the camera module in order to adapt filter settings in the ISP 13, as is indicated by the arrows from the UI 14 to the camera module 11 and on to the ISP 13 in FIG. 1.

The patent application published as WO2011127961A1 discloses an example of a prior art device comprising a decoder for decoding a picture, comprising: an extractor adapted to extract a first subset of syntax elements from a received data stream and a second subset of syntax elements being disjoint from the first subset of syntax elements, wherein the second subset of syntax elements comprises filter indication information defining a first filter for a first region of at least two different regions of the picture and a second filter for a second region of the at least two different regions of the picture; a pre-decoder adapted to pre-decode the picture based on the first subset of syntax elements to produce a reconstructed version of the picture; and a filter stage adapted to apply the first filter to the first region of the reconstructed picture to obtain a first filtered version of the reconstructed version of the picture and to apply the second filter to the second region of the first filtered version of the reconstructed version of the picture to obtain a second filtered version of the reconstructed version of the picture.

The inventors have realized a problem that exists in contemporary image signal processing, namely that an image may comprise several different regions that all exhibit different characteristics, and that one setting for a complete image is not sufficient to provide a high-quality image in all instances. Moreover, ISP settings might depend not only on regional characteristics of the image (lightning conditions and blur), but on what kind of objects are in those regions. Object detection can aid on determining regional ISP settings. Furthermore, as image processing (such as applying filters to a picture) is costly with regards to time and/or processing resources, the subsequent application of different filters to the same picture, as well as reconstructing a picture is indeed a waste of resources.

As the inventors have realized, there is thus a need for a device and a method for providing a manner of processing images that is able to handle images having different characteristics within one single frame in a more efficient manner. Some solutions exist to distinguish focus and illumination between foreground and background planes and adjust ISP accordingly, though these solutions do not use semantic knowledge (OD) to determine appropriate settings. Some solutions provide a series of filters to be applied, however such processing is wasteful of resources.

SUMMARY

An object of the present teachings is to overcome or at least reduce or mitigate the problems discussed in the background section.

According to one aspect an image processing arrangement is provided, the image processing arrangement comprises a controller configured to: a) receive image data; b) perform semantic analysis on the image data to c) identify a first region (R1) and a second region (R2) and to d) select first settings (S1) and second settings (S2) corresponding to the identified first region (R1) and second region (R2) respectively; e) adapt at least one filter according to the selected settings (Sx); and f) perform image processing on image data based on the adapted at least one filter wherein the first settings (S1) are applied to the at least one filter for the first region (R1) and the second settings (S2) are applied to the at least one filter for the second region (R2). It should be noted that the reference first and second does not relate to any order of identifying the regions or selecting the filters.

It should be noted that even if only two regions are mentioned, it would be clear that these are only examples and may be applied to two, three or more regions, to which corresponding settings are selected.

The solution may be implemented as a software solution, a hardware solution or a mix of software and hardware components. One benefit with the proposed solution is that an image will not be optimized for just one scene, such as sport, portrait, landscape etc. The image will be optimized based on localized semantic knowledge of the scene, i.e. what objects are in the image and their locations. Furthermore, the solution reduces the need for time and power consuming post-processing for correcting an image where settings have been optimized for a single aspect or object of the image.

In one embodiment the controller is further configured to perform object detection for the image utilizing an image processing model. In one embodiment the image processing model is based on a Deep Neural Network model.

In one embodiment the controller is further configured to f) perform said image processing based on the adapted at least one filter on the received image data.

In one embodiment the controller is further configured to b1) pre-filter the image data prior to b) performing the semantic analysis.

In one embodiment the controller is further configured to f) perform said image processing based on the adapted at least one filter on subsequently received image data.

In one embodiment the subsequently received image data is aimed for a viewfinder.

In one embodiment the image processing arrangement further comprises an image sensor, and wherein the controller is further configured to e1) also adapt the image sensor based on the selected settings (Sx).

In one embodiment the controller is further configured to d) select the settings (Sx) based on a requirement for a resulting image.

In one embodiment the controller is further configured to d) select the settings (Sx) for the first region (Rx) and the second region (Rx) which are at least partially overlapping one another based on a priority of the first region (Rx) and a priority of the second region (Rx).

In one embodiment the controller is further configured to d) select the settings (Sx) for the first region (Rx) and the second region (Rx) which are at least partially overlapping one another based on a combination of the settings (Sx) for the first region (Rx) and the settings (Sx) for the second region (Rx).

In one embodiment the controller is further configured to b2) determine that a scene represented by the image data has changed, and in response thereto b) perform said semantic analysis.

In one embodiment the semantic analysis is based on a Deep Neural Network model or a machine learning model.

In one embodiment the semantic analysis is based on an object detection, an image segmentation, and/or a scene detection.

In one embodiment the image processing arrangement is a smartphone or a tablet computer.

In one embodiment the image processing arrangement is an optical see-through device.

According to another aspect there is provided a method for object detection in an image processing arrangement, wherein the method comprises: a) receiving image data; b) performing semantic analysis on the image data to c) identifying a first region (R1) and a second region (R2) and d) selecting first settings (S1) and second settings (S2) corresponding to the identified first region and second region respectively; e) adapting at least one filter according to the selected settings (Sx); and f) performing image processing on image data based on the adapted at least one filter wherein the first settings (S1) are applied to the at least one filter for the first region (R1) and the second settings (S2) are applied to the at least one filter for the second region (R2).

According to another aspect there is provided a computer-readable medium carrying computer instructions that when loaded into and executed by a controller of an image processing arrangement enables the image processing arrangement to implement the method according to herein.

According to another aspect there is provided a software component arrangement for image processing in an image processing arrangement, wherein the software component arrangement comprises: a) a software component for receiving image data; b) a software component for performing semantic analysis on the image data; c) a software component for identifying a first region (R1) and a second region (R2); d) a software component for selecting first and second settings (S1, S2) corresponding to the identified first region (R1) and second region (R2) respectively; e) a software component for adapting at least one filter according to the selected first and second settings (S1, S2Sx); and f) a software component for performing image processing on image data based on the adapted at least one filter wherein the first settings (S1) are applied to the at least one filter for the first region (R1) and the second settings (S2) are applied to the at least one filter for the second region (R2).

According to another aspect there is provided an image processing arrangement comprising circuitry for image processing comprising: a) circuitry for receiving image data; b) circuitry for performing semantic analysis on the image data; c) circuitry for identifying a first region (R1) and a second region (R2); d) circuitry for selecting first and second settings (S1, S2, Sx) corresponding to the identified first region (R1) and second region (R2) respectively; e) circuitry for adapting at least one filter according to the selected settings (S1, S2, Sx); and f) circuitry for performing image processing on image data based on the adapted at least one filter wherein the first settings (S1) are applied to the at least one filter for the first region (R1) and the second settings (S2) are applied to the at least one filter for the second region (R2).

Further embodiments and advantages of the present invention will be given in the detailed description. It should be noted that the teachings herein find use in digital imagery arrangements in digital photography as well as many areas of computer vision, including image retrieval, robotic vision, augmented reality and video surveillance.

BRIEF DESCRIPTION OF THE DRAWINGS

Embodiments of the invention will be described in the following, reference being made to the appended drawings which illustrate non-limiting examples of how the inventive concept can be reduced into practice.

FIG. 1 shows a schematic view of a device comprising a camera module according to a prior art;

FIG. 2A shows a schematic view of an image processing arrangement according to an embodiment of the present invention;

FIG. 2B shows a schematic view of an image processing arrangement according to an embodiment of the present invention;

FIG. 2C shows a schematic view of an image processing arrangement according to an embodiment of the present invention;

DETAILED DESCRIPTION

Figure 3A:
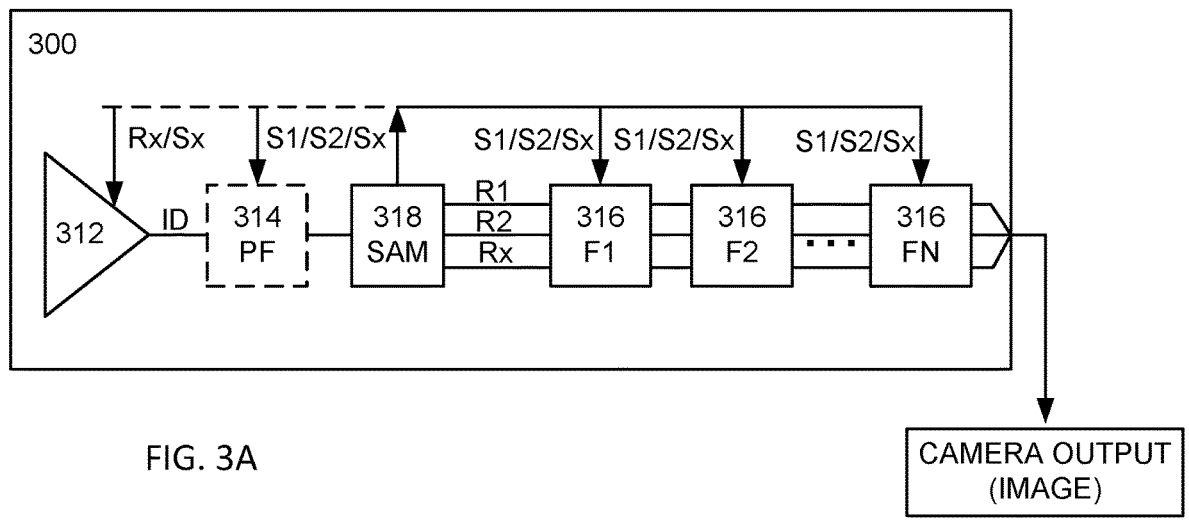
FIG. 3A shows a schematic view of an image processing model according to one embodiment of the teachings herein.

FIG. 2A shows a schematic view of an image processing arrangement 100 according to an embodiment of the present invention. The image processing arrangement 100 comprises a controller 101, an image capturing device 112 (such as an image sensor comprised in a camera module) and a memory 102. As a skilled person would understand the image processing arrangement 100 may comprise one controller 101 and the image capturing device 112 may comprise one controller, but for the purpose of the teachings herein, they will be considered to be the same controller 101 in order to cover all possible variations of exactly where the processing of an image takes place. The controller 101 is configured to receive image data representative of an image (or at least a portion of an image) from the image capturing device 112, and to perform image processing on the received (portion of the) image. The image capturing device 112 may be comprised in the image processing arrangement 100 by being housed in a same housing as the image processing arrangement 100, or by being connected to it, by a wired connection or wirelessly.

It should be noted that the image processing arrangement 100 may comprise a single device or may be distributed across several devices and apparatuses.

The controller 101 is also configured to control the overall operation of the image processing arrangement 100. In one embodiment, the controller 101 is a graphics controller. In one embodiment, the controller 101 is a general purpose controller. In one embodiment, the controller 101 is a combination of a graphics controller and a general purpose controller. As a skilled person would understand there are many alternatives for how to implement a controller, such as using Field-Programmable Gate Arrays circuits, ASIC, GPU, etc. in addition or as an alternative. For the purpose of this application, all such possibilities and alternatives will be referred to simply as the controller 101.

It should also be noted that in one embodiment, parts of or all of the processing is performed remotely, where a local controller 101 is configured to provide input data to a remote processing unit, such as in a cloud server, causing the remote processing unit to perform the processing and receiving the results of such processing as output from the remote processing unit. For the purpose of this application, such possibilities and alternatives will also be referred to simply as the controller 101, the controller thus representing both the local controller and the remote processing unit.

The memory 102 is configured to store graphics data, ISP settings and computer-readable instructions that when loaded into the controller 101 indicates how the image processing arrangement 100 is to be controlled. The memory 102 may comprise several memory units or devices, but they will be perceived as being part of the same overall memory 102. There may be one memory unit for a display arrangement storing graphics data, one memory unit for image capturing device storing settings, one memory for the communications interface (see below) for storing settings, and so on. As a skilled person would understand there are many possibilities of how to select where data should be stored and a general memory 102 for the image processing arrangement 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

It should be noted that the teachings herein find use in image processing arrangements 100 in many areas of digital imagery including digital photography, enhanced vision, computer vision, mixed or augmented reality systems, image retrieval, industrial use, robotic vision and video surveillance where a basic image processing arrangement 100 such as in FIG. 2A may be utilized.

FIG. 2B shows a schematic view of an image processing arrangement being a viewing device 100 according to an embodiment of the present invention. In this embodiment, the viewing device 100 is a smartphone or a tablet computer. In such an embodiment, the viewing device further comprises a display arrangement 110, which may be a touchscreen, and the image capturing device 112 may be a (series of) camera(s) of the smartphone or tablet computer. In such an embodiment the controller 101 is configured to receive an image from the (series of) camera(s) 112, process the image and most likely (but not necessarily) display the image on the display arrangement 110.

FIG. 2C shows a schematic view of an image processing arrangement being an optical see-through (OST) (including video-see-through) viewing device 100 according to an embodiment of the present invention. The viewing device 100 is a see-through device, where a user looks in through one end, and sees the real-life objects in the line of sight at the other end of the viewing device 100.

In one embodiment the viewing device 100 is a head-mounted viewing device 100 to be worn by a user (not shown explicitly in FIG. 2C) for looking through the viewing device 100. In one such embodiment the viewing device 100 is arranged as glasses, or other eye wear including goggles, to be worn by a user.

The viewing device 100 is in one embodiment arranged to be hand-held, whereby a user can hold up the viewing device 100 to look through it.

The viewing device 100 is in one embodiment arranged to be mounted on for example a tripod, whereby a user can mount the viewing device 100 in a convenient arrangement for looking through it. In one such embodiment, the viewing device 100 may be mounted on a dashboard of a car or other vehicle.

In one embodiment the viewing device 100 is a digital imagery device for providing enhanced vision (such as night vision).

In one embodiment the viewing device is a virtual, augmented reality or mixed reality device for providing a virtual reality, an augmented reality or a mixed reality to a user.

The viewing device 100 comprises an image capturing device 112 for capturing an image and a display arrangement 110 for presenting the captured and processed image to a viewer. As disclosed above with reference to FIG. 2A, the image capturing device 112 may be remote and comprised in the image processing arrangement through a connection to the image processing arrangement 100.

In the following, simultaneous reference will be made to the image processing arrangements 100 of FIGS. 2A, 2B and 2C.

It should also be noted that even if only one image capturing device 112 is discussed in the above, the image capturing device is arranged to potentially receive image data relating to more than one image and/or image source. The multiple streams of image data may be provided as separate data streams originating from different cameras. The image processing arrangement 100 thus comprises a multiple of cameras as being comprised in the image capturing device 112.

In one embodiment the image processing arrangement 100 may further comprise a communication interface 103. The communication interface 103 may be wired and/or wireless. The communication interface may comprise several interfaces.

In one embodiment the communication interface 103 comprises a USB (Universal Serial Bus) interface. In one embodiment the communication interface 103 comprises a HDMI (High Definition Multimedia Interface) interface. In one embodiment the communication interface 103 comprises a Display Port interface. In one embodiment the communication interface 103 comprises an Ethernet interface. In one embodiment the communication interface 103 comprises a MIPI (Mobile Industry Processor Interface) interface. In one embodiment the communication interface comprises an analog interface, a CAN (Controller Area Network) bus interface, an I2C (Inter-Integrated Circuit) interface, or other interface.

In one embodiment the communication interface 103 comprises a radio frequency (RF) communications interface. In one such embodiment the communication interface 103 comprises a Bluetooth™ interface, a WiFi™ interface, a ZigBee™ interface, a RFID™ (Radio Frequency IDentifier) interface, Wireless Display (WiDi) interface, Miracast interface, and/or other RF interface commonly used for short range RF communication. In an alternative or supplemental such embodiment the communication interface 103 comprises a cellular communications interface such as a fifth generation (5G) cellular communication interface, an LTE (Long Term Evolution) interface, a GSM (Global Systéme Mobile) interface and/or other interface commonly used for cellular communication. In one embodiment the communication interface 103 is configured to communicate using the UPnP (Universal Plug n Play) protocol. In one embodiment the communication interface 103 is configured to communicate using the DLNA (Digital Living Network Appliance) protocol.

In one embodiment, the communication interface 103 is configured to enable communication through more than one of the example technologies given above. As an example, a wired interface, such as MIPI could be used for establishing an interface between the display arrangement, the controller and the user interface, and a wireless interface, for example WiFi™ could be used to enable communication between the image processing arrangement 100 and an external host device (not shown).

The communications interface 103 may be configured to enable the image processing arrangement 100 to communicate with other devices, such as other image processing arrangements 100 and/or smartphones, Internet tablets, computer tablets or other computers, media devices, such as television sets, gaming consoles, video viewer or projectors (not shown), or image capturing devices for receiving the image data.

A user interface 104 may be comprised in the image processing arrangement 100 (only shown in FIG. 2B). Additionally or alternatively, (at least a part of) the user interface 104 may be comprised remotely in the image processing arrangement 100 through the communication interface 103, the user interface 104 then (at least a part of it) not being a physical means in the image processing arrangement 100, but implemented by receiving user input through a remote device (not shown) through the communication interface 103. One example of such a remote device is a game controller, a mobile phone handset, a tablet computer or a computer.

FIG. 3A shows a schematic view of a general image processing model 300 according to one embodiment of the teachings herein. The image processing model 300 is arranged to be executed by a controller 101 of on image processing arrangement 100 according to herein, a software component arrangement 500 (see FIG. 5) according to herein, an arrangement comprising circuitry 600 (see FIG. 6) according to herein or being utilized by a method according to herein. It should be noted that different parts of the image processing model may be executed by different parts of the corresponding executing arrangement.

The image processing model 300 comprises an image data receiver 312 that receives image data corresponding to an image, such as image sensor data received from an image sensor 112. The image data receiver 312 is, in one embodiment, operatively connected to an image source, such as an image sensor. The image data is represented by the arrow marked ID in FIG. 3A.

As in contemporary ISP models, the image processing model 300 according to the teachings herein comprises a series of filters 316 F1, F2 . . . FN to be applied to the image data. Examples of such filters 316 are demosaicing, noise reduction and image sharpening to mention a few examples. A skilled person would understand that many more filters are possible and may be present in the image processing model 300. A pre-filter PF 314 may also be comprised in the image processing model 300. Examples of such pre-filtering is for providing the image data in a readable format and to reduce or remove any errors in the image data and/or even to perform demosaicing.

However, unlike contemporary image processing models, the image processing model 300 of according to the teachings herein, also comprise a semantic analysis module (SAM) 318. The SAM 318 is arranged to perform semantic analysis on the possibly pre-filtered image data in order to identify at least one region Rx in the image, and to select a filter setting for that region and cause or instruct the filters 316 to filter the at least one region Rx with the corresponding selected filter settings Sx. The SAM is thus arranged to possibly identify a first region R1 and a second region R2 (as examples of the at least one region) and to select a first filter setting S1 for the first region and a second filter setting S2 for the second region R2. The corresponding filters are adapted according to the filter settings and are applied to the first region and the second region in parallel. It should be noted that the first settings are only applied to the first region and the second settings are only applied to the second region. It can also be noted that in one embodiment are the settings applied to more than one filter (the settings may then be filter specific).

In one embodiment the SAM 318 is configured to perform object detection and identify a region Rx as a region comprising a detected object. The settings are chosen depending on the type of detected object. Object detection is a computer technology related to computer vision and image processing that deals with detecting instances of semantic objects of a certain class, either in foreground (such as humans, buildings, or cars) or background (e.g., grass, sand, water) in digital images.

In one embodiment the SAM 318 is configured to perform object classification (also known as object recognition) and identify a region Rx as a region comprising a classified object. In one embodiment, there is no image region associated with the object's location, only a region to be specifically process. The settings are chosen depending on the type of classified object. Object recognition (object classification) is a computer technology related to computer vision and image processing that deals with recognizing one or several pre-specified or learned objects or object classes, usually together with their positions in the image.

In one embodiment the SAM 318 is configured to perform image segmentation and identify a region Rx as a segment. The settings are chosen depending on characteristics of the segment. Image segmentation is a computer technology related to computer vision and image processing that deals with partitioning a digital image into multiple segments (sets of pixels sharing some characteristics) in order to simplify and/or change the representation of an image, typically used to locate objects and boundaries (lines, curves, etc.) in images.

In one embodiment the SAM 318 is configured to perform scene detection, such as foreground detection and/or background detection, and identify a region Rx as a scene (for example a foreground or background, or a background in combination with a foreground). The settings are chosen depending on the detected scene.

It should be noted that other methods of semantic analysis are possible and are to be considered as included in the teachings herein.

The introduction of the SAM 318 in the image processing model 300 thus enable for processing an image differently in different regions to optimize the filtering of the image, even if several scenes and/or objects are present in the same image. As for example objects are found and positioned in an image the image is divided in several regions. The division in regions may be performed before, while or after identifying an object. The regions will be processed differently depending on what kind of object it is. The ISP will run different algorithms depending on the region, for example if there is a background of blue sky that area will be optimized for blue sky. There is a person in the foreground and that part will be optimized for persons, with algorithms that are optimized for skin color and clothing.

In one embodiment, the image processing model 300 is also configured to enable the SAM 318 to also instruct the image data receiver 312 (such as the camera image sensor (CIS)) that some sensor settings need to be adapted. If the sensor supports these different settings at different part of the sensor, the different sensor settings can be applied accordingly. Otherwise the sensor can multiplex the different areas and stitch the image together at the end. Examples of sensor settings are exposure time, gain etc.

Figure 3B:
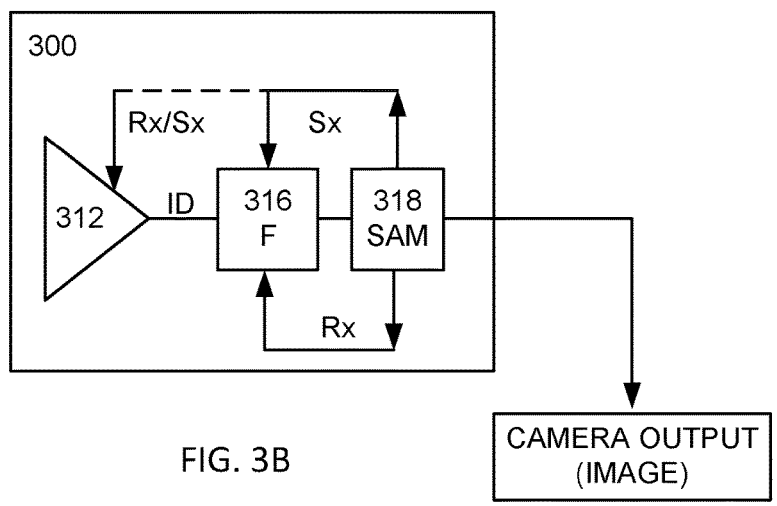
FIG. 3B shows a schematic view of an image processing model according to one embodiment of the teachings herein.

FIG. 3B shows a schematic view of one embodiment of an image processing model 300 according to the teachings herein. In this embodiment, all filters (F) 316 are arranged prior to the semantic analysis module (SAM) 318. As such any pre-filtering is considered as part of the 316 (F) filters. In this embodiment, the filters 316 receives the image data and performs the image processing on the image data. The filtered or processed image data is then subjected to the semantic analysis of SAM 318, where by regions Rx are identified and settings Sx selected accordingly. The regions Rx and the corresponding settings Sx are fed back to the filters 316 so that they may be adjusted accordingly. As for the image processing model 300 of FIG. 3A, regions and corresponding settings may be fed back to the image data receiver 312.

In the embodiment of FIG. 3B, one frame of the image is required for performing the semantic analysis and to find the necessary settings for the filters as the SAM 318 is arranged after the filters 316. For a video processing this means that the first frame of every sequence is filtered differently than the subsequent frames, and should possibly be discarded to maintain a high level of quality.

In still photography, and in video photography, the additional frame needed for identifying regions and selecting settings may be provided in advance of capturing the actual image.

In one embodiment, the additional frame (or image) used for the semantic analysis is provided by the image data receiver 312 as a shutter button or other part of the user interface 14 is partially depressed, such as halfway. As most image processors are high-speed processors they should be able to perform the identification of regions, selection of corresponding settings and subsequent adaptation of the filters 316 before the actual image is captured, i.e. before the shutter button is fully depressed. In order to speed up the semantic analysis and subsequent adaptation, the additional frame may be of a lower resolution than the actual image. As only a semantic analysis is to be performed, full resolution may not be necessary and may thus be disregarded.

In an additional or alternative embodiment, the additional frame (or image) used for the semantic analysis is provided through an alternative image pipe running from the image sensor to a view finder of the image processing arrangement 100, such as the display 110. The image displayed in a view finder is usually not the same image that is saved as an image is captured and may thus be rejected at no actual cost. Furthermore, the image displayed in the view finder is usually of a lower resolution than the image captured, which, as discussed above, speeds up the processing and analysis of the viewfinder image.

In an embodiment, where the semantic analysis is performed post-filtering as in the model shown in FIG. 3B, the semantic analysis 318, need not necessarily be part of the image processing model, but can be performed as part of a later analysis model, such as an object detection model, whereby the identified regions are fed back to the image processing model for selection of appropriate corresponding filters.

Alternatively or additionally, the result of the SAM 318 may be fed out along with the image for later use along with the image. For example, if the SAM 318 comprises a full object detection, the result of such an object detection may be fed out along with the image for use in other or additional services and/or applications, thereby saving the need for another object detection.

Based on a comparison of the image processing models 300 of both FIG. 3A and of FIG. 3B, it should be noted that the SAM 318 may be arranged at any position within the series of filters 316; before, anywhere in-between or after.

As a scene rarely changes by much compared to the speed at which an image is captured, the SAM 318 and subsequent identification of regions, selections of appropriate settings and adaptation of the filters 316/314 and possibly the sensor 312 need not be performed for every image. To enable this the controller 101 of the image processing arrangement 100 is in one embodiment configured to determine that a scene has changed and in response thereto cause the SAM 318 to be executed with the subsequent identification of regions, selections of appropriate settings and adaptation of the filters 316/314 and possibly the sensor 312. The controller 101 is, in one embodiment, configured to determine that a scene has changed by comparing it to a previous scene. The controller 101 is, in one embodiment, configured to determine that a scene has changed by detecting a change in luminescence and/or a color change. The controller 101 is, in one embodiment, configured to determine that a scene has changed by determining a field of view change. The controller 101 is, in one embodiment, configured to determine that a scene has changed by detecting a movement if a detected or identified object or scene.

In embodiments where the SAM 318 performs computational heavy analyses such as object detection, processing power may be reduced by instead performing object tracking on subsequent images, at least for the regions where object tracking is possible. As object tracking requires less computational power than object detection, the overall computational power required is also reduced.

In one embodiment the selected settings indicate an algorithm to be used for the corresponding region by the filter. The algorithm may be selected depending on the type of scene and/or object that is in the region Rx.

In one embodiment the selected settings indicate a parameter to be used for an algorithm to be used for the corresponding region Rx by the filter.

The algorithm and/or the parameter may alternatively or additionally be selected depending on requirements for the region and/or overall image, such as accuracy, quality, size, and so on.

The filter settings selected for a filter based on an identified region Rx may be selected based on different criteria such as processing power need, computational speed, accuracy, resulting memory size to mention a few examples. In some embodiments, the SAM 318 is arranged to select a filter setting based on compromising several of these criteria, for example to find a suitable compromise between accuracy and computational speed. The compromise may be directed by user settings, such as settings for desired image quality. The SAM 318 is on one embodiment arranged to select different criteria or compromises of criteria for different regions. Especially since different regions Rx may have different requirements or complexities. For example a foreground may only need a simple filtering, while a face needs a much more advanced or accurate filtering.

In some embodiments, the image processing arrangement 100 is configured to perform the semantic analysis, such as object detection or segmentation, utilizing an image processing model based on Machine Learning or Deep Neural Networks. Semantic analysis is generally an analysis of an image for finding (via processing) low-level features (color, intensity, and so on) of pixels to find pixels belonging to the same structure or object, and optionally to determine which type of object it is.

Figure 4:
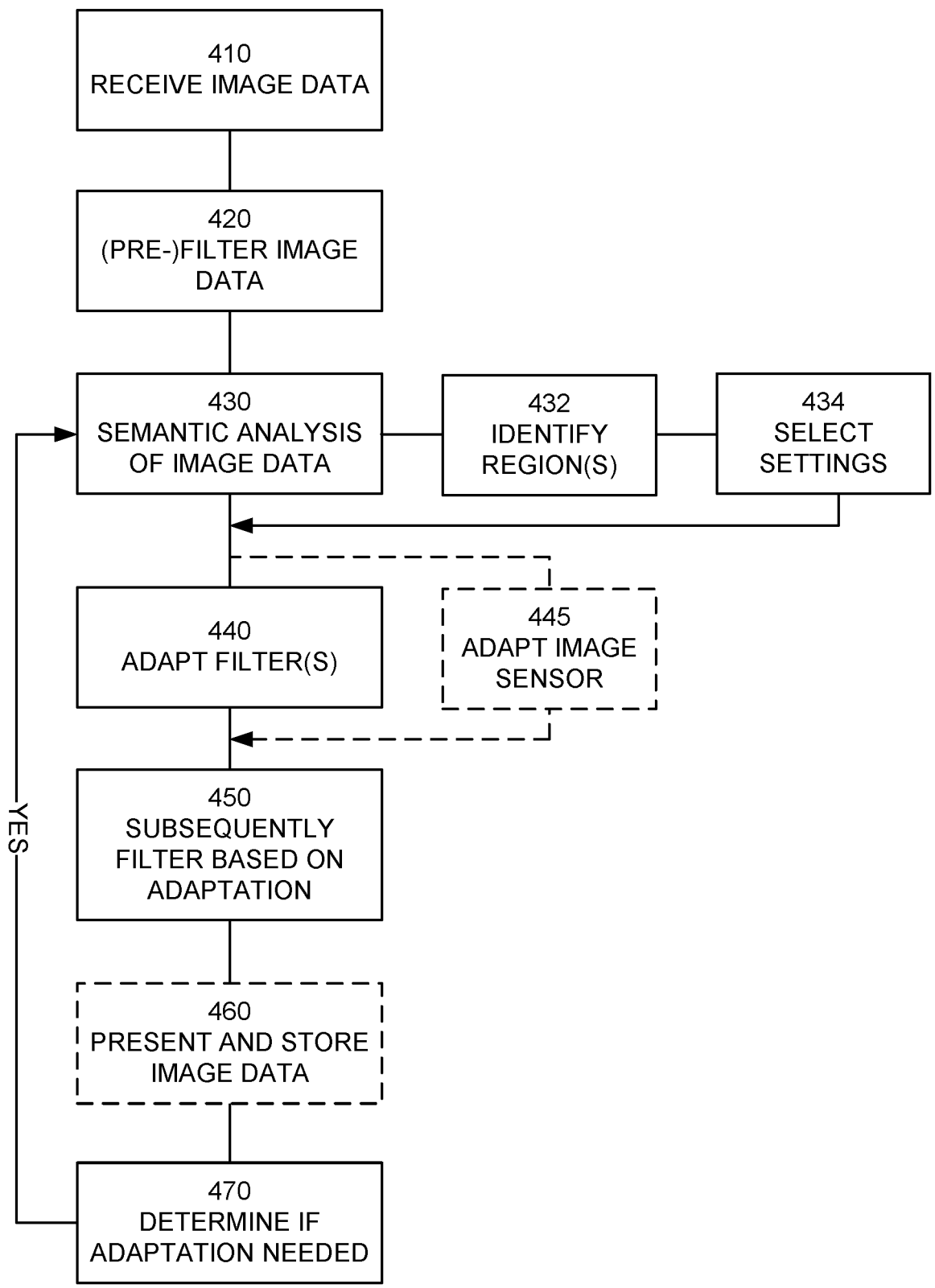
FIG. 4 shows a flowchart of a general method according to an embodiment of the present invention.

FIG. 4 shows a general flowchart for a method according to the teachings herein. The method corresponds to the image processing model 300 of FIG. 3A and of FIG. 3B. Image data is received 410 from an image sensor 112, 312 and filtered 420 by being subjected to at least one image processing filter 316. In one embodiment, as in FIG. 3A the image data is possibly subjected to a pre-filter 314 (or other initial filtering). The pre-filtering is not aimed at providing an image for human viewing, but to render the image—or part thereof—in a format that is suitable for a subsequent semantic analysis.

A semantic analysis 430 is then performed on the (pre-) filtered image data by subjecting it to a semantic analysis module 318, for identifying 432 regions Rx and selecting 434 appropriate settings Sx for the regions. In one embodiment at least a first region R1 and a second region R2 are identified and first settings (S1) are selected for the first region and second settings (S2) are selected for the second region.

The image data is sent to the semantic analysis in a format that is adjusted for the semantic analysis. The semantic analysis provides information of what objects and/or scenes are in the image. Examples include but are not limited to objects such as sky, sand, person, and umbrella. The information on the object classes will be used to select the settings. The semantic analysis of the image is also used to define the areas where the different settings should be applied, i.e. to identify the regions Rx. In situations where regions overlap, the selected setting may be a combination of settings for the overlapping regions. Alternatively or additionally, the setting is selected based on a priority of a classification of the region, where for example a face object has a higher priority than a foreground object, and/or for example a region being covered to a larger percentage by an object, such as a face, has a higher priority than a region covered to a lower extent. Alternatively or additionally, the setting is selected as a weighted combination of the settings for the overlapping region, where the weighting is determined based on a priority of a classification of the region Rx and/or based on a priority of the class or type of object in the region. Such an embodiment may be seen as a combination of selecting settings based on priority and selecting settings based on a combination.

In one embodiment, the semantic analysis is arranged to not provide overlapping regions, but to analyze an image so that no overlapping regions exist, even if this would result in additional regions being provided. This may be achieved by image segmentation and/or by splitting regions, for example by clustering features division lines or curve.

The image processing arrangement 100 selects the settings based on information, such as object information, scene information and/or segmentation information, provided by the semantic analysis. The image processing arrangement 100 may determine if there is a setting profile matching the information provided by the semantic analysis, and if so select that setting profile for the corresponding region Rx as specified by the information provided by the semantic analysis.

In one embodiment, the image processing arrangement 100 is configured to select settings in an area where regions Rx border each other, or partially overlap, by interpolating or combining the settings for each region. This provides for a smooth transition between the regions instead of an abrupt change.

The regions Rx and the corresponding settings Sx are fed to the filters 316/314 whereby the filters 316/314 are adapted 440 according to the settings Sx for the regions Rx. In one embodiment the first settings S1 are applied to the at least one filter 316 (and possibly also in the pre-filtering 314) for the first region R1 and the second settings S2 are applied to the at least one filter for the second region R2.

In some embodiments, the image processing arrangement 100 is further configured to determine that settings for the image sensor 312 should also be adapted. In such an embodiment, the regions Rx and the corresponding selected settings Sx are also fed to the image sensor for updating 445 the image sensor.

If the image sensor is arranged to have multiple sensor settings for different regions, the image sensor will adapt its settings for a given region Rx based on the corresponding settings Sx.

If the image sensor is only configured to have one region, the image processing arrangement 100 may be arranged to determine the most suitable sensor setting based on the different objects in the image. Alternatively or additionally, the image processing arrangement 100 may be configured to multiplex images in sequence and executing all the different selected settings and then stitched the multiplexed images together based on the corresponding regions.

Subsequent filtering 450 is performed for each identified region Rx as per the corresponding adapted setting Sx.

The subsequent filtering is in one embodiment (as in the image processing model 300 of FIG. 3A) performed by the filters 316 for the same image data constituting the main image processing for the image data. In an embodiment where the image was pre-filtered before the semantic analysis, the subsequent adapted filtering may be performed on the original image data, as before the pre-filtering.

The subsequent filtering is in an alternative embodiment (as in the image processing model 300 of FIG. 3B) performed by the filters 316 for a subsequent set of image data (i.e. image). In such an embodiment, the original image data may be discarded as discussed above.

As the image data has been properly filtered the resulting image may be presented 460 to a user, for example via the display 110 and the user may decide to capture the image, i.e. to store the image data in the memory 102. In one embodiment, the image data is split in two parallel pipelines. One pipeline is going to the semantic analysis. The image data going to the semantic analysis is adjusted based on settings for the semantic analysis when it comes to size, bit width, color depth etc. The other pipeline sends the image data to the user so that the image can be previewed on a display or any other media. This also enables the user to decide if the image data should be stored as a snapshot or a video stream.

In one embodiment, it is determined 470 whether a new adaptation is need, for example by determining if a scene in the image has changed, and if so a new semantic analysis is performed on a subsequent set of image data (i.e. image) as indicated by the arrow back to the semantic analysis 430. In one embodiment, where the image processing arrangement 100 comprises a motion detector or inertial measurement unit (IMU), comprising for example at least one or a plurality of accelerometers, gyros and/or a magnetometers, the image processing arrangement 100 is configured to determine that a the image has changed based on detecting a movement. In one embodiment, the movement is detected if it is determined that the movement is exceeding a movement threshold. The movement threshold may relate to a movement, an acceleration, and/or an angular movement. In one embodiment, where the image processing arrangement 100 comprises means or calculation modules to determine blur in the image data, the blur being indicative of motion, the image processing arrangement 100 is configured to determine that the image has changed based on determining blur exceeding a blur threshold.

Figure 5:
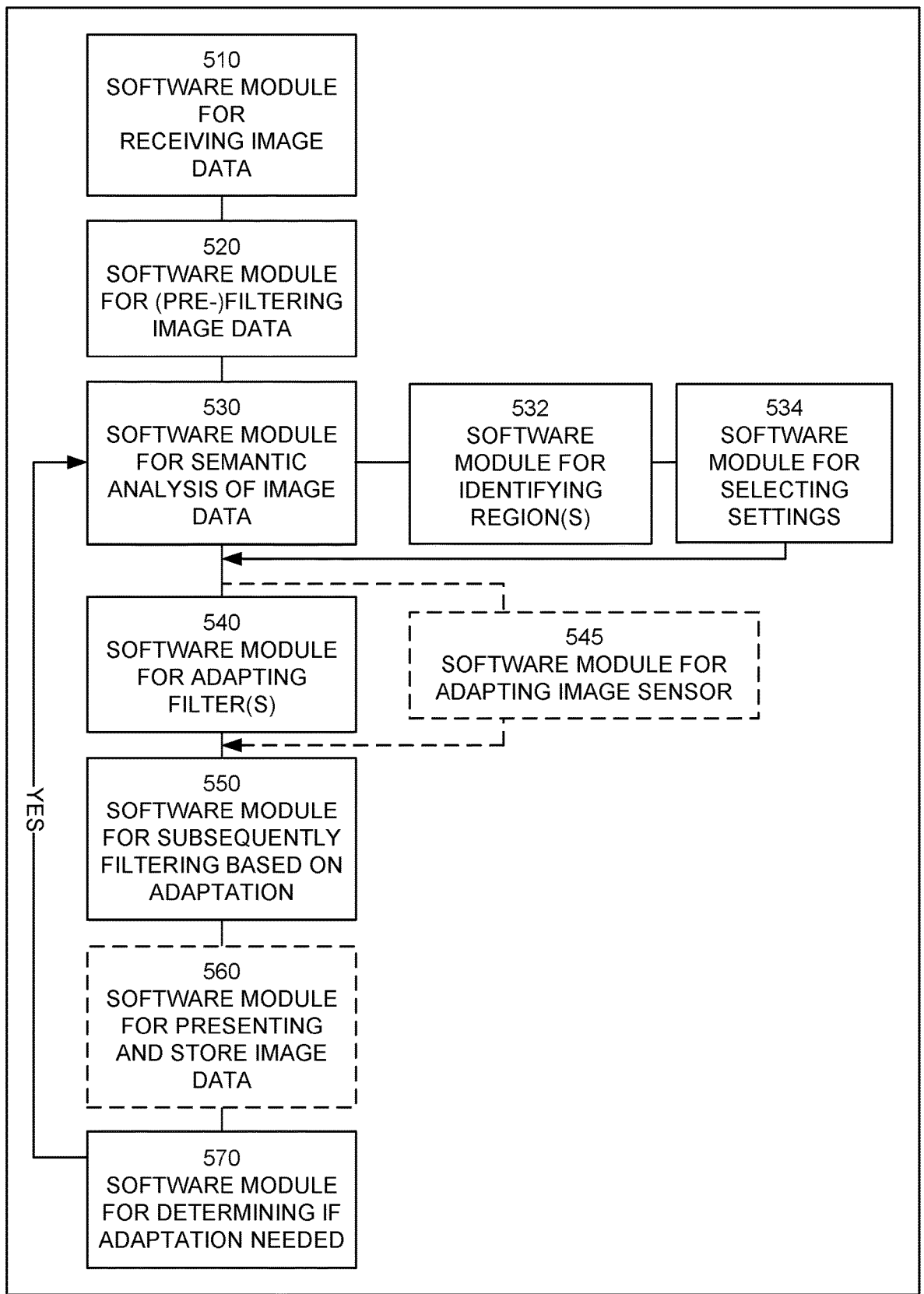
FIG. 5 shows a component view for a software component arrangement according to an embodiment of the teachings herein.

FIG. 5 shows a component view for a software component (or module) arrangement 500 according to an embodiment of the teachings herein. The software component arrangement 500 is adapted to be used in an image processing arrangement 100 as taught herein for providing image processing as taught herein.

The software component arrangement 500 comprises a software component for receiving (510) image data. The software component arrangement 500 also comprises a software component for performing semantic analysis 530 on the image data and a software component for identifying 532 at least one region Rx. The software component arrangement 500 also comprises a software component for selecting 534 settings Sx corresponding to the identified at least one region Rx, a software component for adapting 540 at least one filter 316, 314 according to the selected settings Sx, and a software component for performing 550 image processing on image data based on the adapted at least one filter 316, 314.

Figure 6:
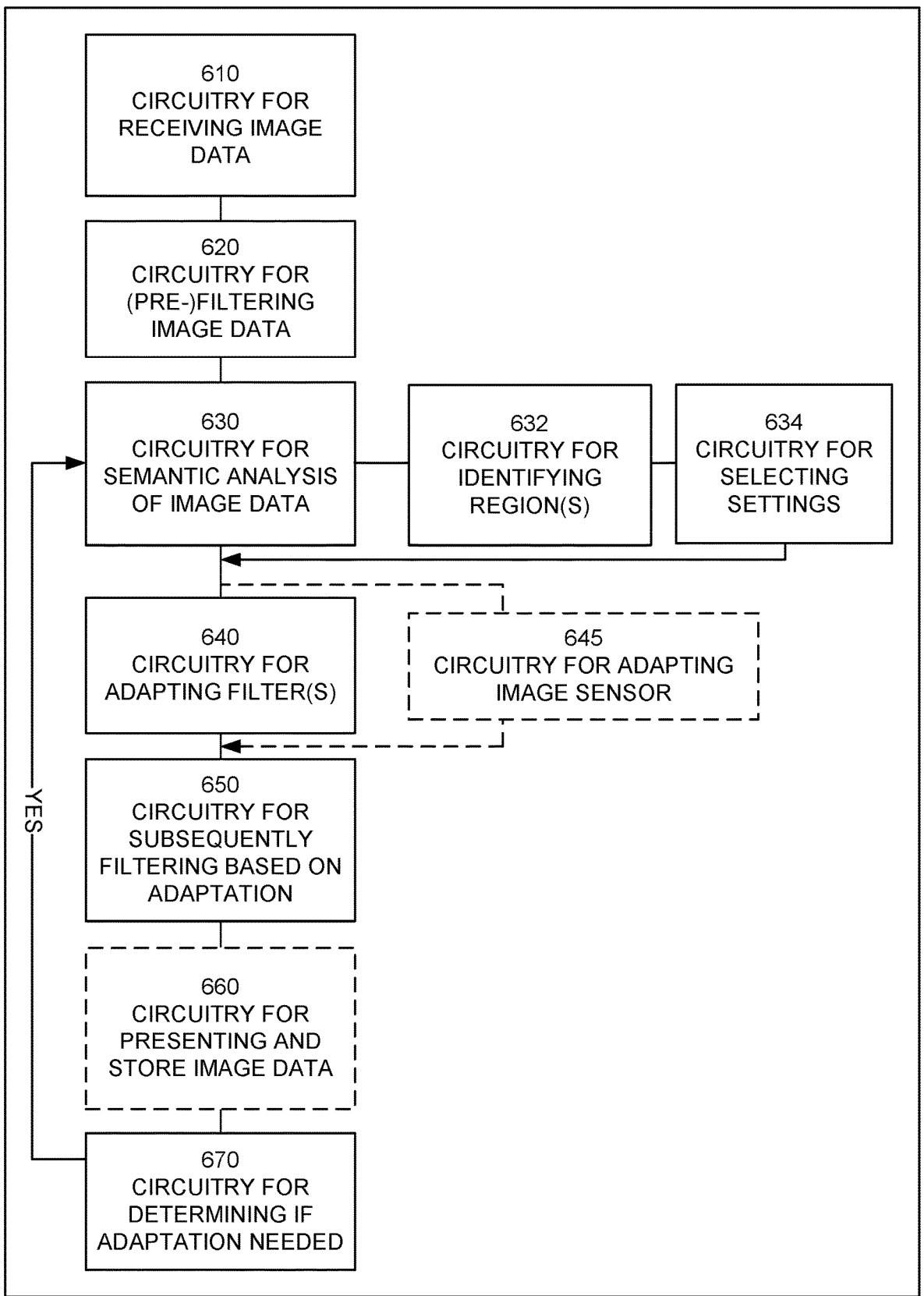
FIG. 6 shows a component view for an arrangement comprising circuits according to an embodiment of the teachings herein.

FIG. 6 shows a component view for an arrangement comprising circuitry for image processing 600 according to an embodiment of the teachings herein. The arrangement comprising circuitry for image processing 600 is adapted to be used in an image processing arrangement 100 as taught herein for providing image processing. The arrangement comprising circuitry for image processing 600 of FIG. 6 comprises circuitry for receiving 610 image data. The arrangement comprising circuitry for image processing 600 also comprises circuitry for performing semantic analysis 630 on the image data and circuitry for identifying 632 at least one region Rx. The arrangement comprising circuitry for image processing 600 also comprises circuitry for selecting 634 settings Sx corresponding to the identified at least one region Rx, circuitry for adapting 640 at least one filter 316, 314 according to the selected settings Sx, and circuitry for performing 650 image processing on image data based on the adapted at least one filter 316, 314.

Figure 7:
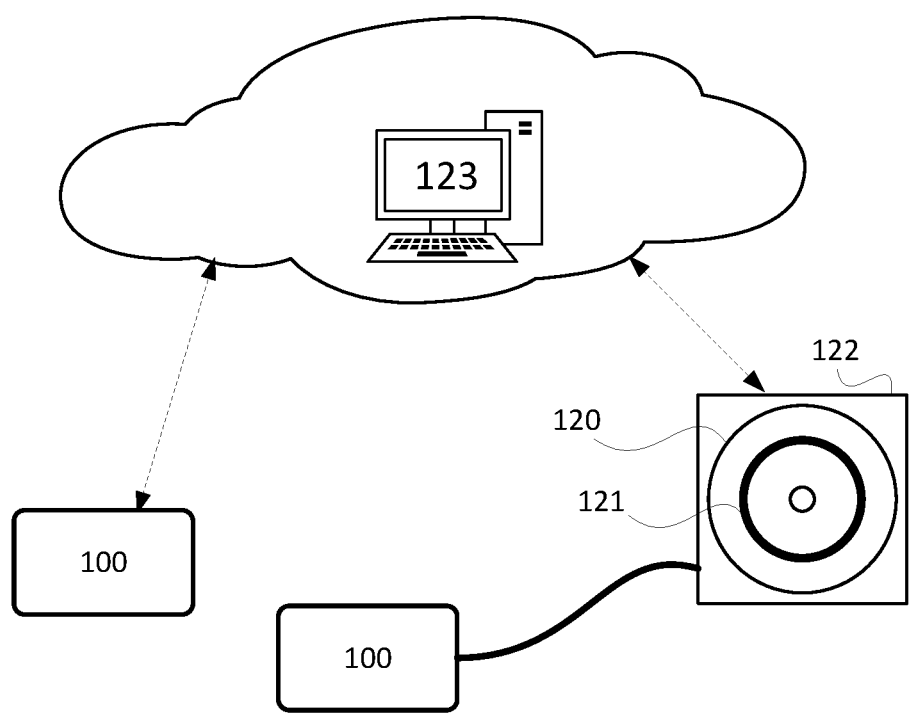
FIG. 7 shows a schematic view of a computer-readable medium carrying computer instructions that when loaded into and executed by a controller of an arrangement enables the arrangement to implement an embodiment of the present invention.

FIG. 7 shows a schematic view of a computer-readable medium 120 carrying computer instructions 121 that when loaded into and executed by a controller of an image processing arrangement 100 enables the image processing arrangement 100 to implement the present invention.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 7, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the image processing arrangement 100 for being executed by the controller 101.

The computer disc reader 122 may also or alternatively be connected to (or possibly inserted into) an image processing arrangement 100 for transferring the computer-readable computer instructions 121 to a controller of the image processing arrangement 100 (presumably via a memory of the image processing arrangement 100).

FIG. 7 shows both the situation when an image processing arrangement 100 receives the computer-readable computer instructions 121 via a server connection and the situation when another image processing arrangement 100 receives the computer-readable computer instructions 121 through a wired interface. This enables for computer-readable computer instructions 121 being downloaded into an image processing arrangement 100 thereby enabling the image processing arrangement 100 to operate according to and implement the invention as disclosed herein.

The invention claimed is:

1. An image processing arrangement comprising circuitry configured to:
   receive image data from an image sensor via an image data receiver of the image processing arrangement, wherein the image data is raw sensor data;
   perform semantic analysis on the image data to identify a first region and a second region, and to select first settings and second settings corresponding to the identified first region and second region, respectively;
   adapt at least one filter according to the selected first and second settings;
   perform image processing on image data based on the adapted at least one filter, wherein the first settings are applied to the at least one filter for the first region and the second settings are applied to the at least one filter for the second region; and
   feed back information that indicates the first and second regions and the first and second settings to the image data receiver.

2. The image processing arrangement according to claim 1, wherein the circuitry is further configured to perform said image processing based on the adapted at least one filter on the received image data.

3. The image processing arrangement according to claim 2, wherein the circuitry is further configured to pre-filter the image data prior to performing the semantic analysis.

4. The image processing arrangement according to claim 1, wherein the circuitry is further configured to perform said image processing based on the adapted at least one filter on subsequently received image data.

5. The image processing arrangement according to claim 4, wherein the subsequently received image data is aimed for a viewfinder.

6. The image processing arrangement according to claim 1, wherein the image processing arrangement further comprises the image sensor, and wherein the circuitry is further configured to also adapt the image sensor based on the selected first and second settings.

7. The image processing arrangement according to claim 1, wherein the circuitry is further configured to select the first and second settings based on a requirement for a resulting image.

8. The image processing arrangement according to claim 1, wherein the circuitry is further configured to select the first and second settings for the first region and the second region which are at least partially overlapping one another based on a priority of the first region and a priority of the second region.

9. The image processing arrangement according to claim 1, wherein the circuitry is further configured to select the first and second settings for the first region and the second region which are at least partially overlapping one another based on a combination of the first settings for the first region and the second settings for the second region.

10. The image processing arrangement according to claim 1, wherein the controller circuitry is further configured to determine that a scene represented by the image data has changed, and perform said semantic analysis in response thereto.

11. The image processing arrangement according to claim 1, wherein the semantic analysis is based on a Deep Neural Network model or a machine learning model.

12. The image processing arrangement according to claim 1, wherein the semantic analysis is based on an object detection, an image segmentation, and/or a scene detection.

13. The image processing arrangement according to claim 1, wherein the image processing arrangement is a smartphone or a tablet computer.

14. The image processing arrangement according to claim 1, wherein the image processing arrangement is an optical see-through device.

15. The image processing arrangement of claim 1, wherein the image processing arrangement further comprises the image data receiver, wherein the image sensor supports applying different settings at different parts of the image sensor, and wherein the image data receiver comprises circuitry configured to adapt settings of the image sensor such that the first and second settings are respectively applied by the image sensor to first and second parts of the image sensor corresponding to the first and second regions.

16. A method for object detection in an image processing arrangement, wherein the method comprises:
    receiving image data from an image sensor via an image data receiver of the image processing arrangement, wherein the image data is raw sensor data;
    performing semantic analysis on the image data to identify at least one first region and a second region, and to select first settings and second settings corresponding to the identified first region and second region, respectively;
    adapting at least one filter according to the selected first and second settings;
    performing image processing on image data based on the adapted at least one filter, wherein the first settings are applied to the at least one filter for the first region and the second settings are applied to the at least one filter for the second region; and
    feeding back information that indicates the first and second regions and the first and second settings to the image data receiver.

17. The method according to claim 16, wherein performing said image processing comprises performing said image processing based on the adapted at least one filter on the received image data.

18. The method of claim 16, wherein the image processing arrangement further comprises the image data receiver, wherein the image sensor supports applying different settings at different parts of the image sensor, and wherein the method further comprises the image data receiver adapting settings of the image sensor such that the first and second settings are respectively applied by the image sensor to first and second parts of the image sensor corresponding to the first and second regions.

19. A computer-readable medium carrying computer instructions that, when loaded into and executed by a controller of an image processing arrangement, enables the image processing arrangement to:
- receive image data from an image sensor via an image data receiver of the image processing arrangement, wherein the image data is raw sensor data;
- perform semantic analysis on the image data to identify a first region and a second region, and to select first settings and second settings corresponding to the identified first region and second region, respectively;
- adapt at least one filter according to the selected first and second settings;
- perform image processing on image data based on the adapted at least one filter, wherein the first settings are applied to the at least one filter for the first region and the second settings are applied to the at least one filter for the second region; and
- feed back information that indicates the first and second regions and the first and second settings to the image data receiver.

20. The computer-readable medium of claim 19, wherein the image processing arrangement further comprises the image data receiver, wherein the image sensor supports applying different settings at different parts of the image sensor, and wherein the computer instructions enable the image data receiver to adapt settings of the image sensor such that the first and second settings are respectively applied by the image sensor to first and second parts of the image sensor corresponding to the first and second regions.

* * * * *